(12) United States Patent
Kleinikkink et al.

(10) Patent No.: US 10,974,914 B2
(45) Date of Patent: Apr. 13, 2021

(54) LINEAR MOTOR CONVEYOR SYSTEM AND MOVING ELEMENTS THEREFOR PROVIDING A REDUCED TOOLING PITCH

(71) Applicant: ATS AUTOMATION TOOLING SYSTEMS INC., Cambridge (CA)

(72) Inventors: Albert Kleinikkink, Cambridge (CA); Roger Hogan, Cambridge (CA); Ian Cameron, Cambridge (CA)

(73) Assignee: ATS Automation Tooling Systems Inc., Cambridge (CA)

(*) Notice: Subject to any disclaimer, the term of this patent is extended or adjusted under 35 U.S.C. 154(b) by 0 days.

(21) Appl. No.: 16/539,519

(22) Filed: Aug. 13, 2019

(65) Prior Publication Data
US 2019/0375597 A1 Dec. 12, 2019

Related U.S. Application Data

(63) Continuation of application No. PCT/CA2018/050159, filed on Feb. 13, 2018.

(60) Provisional application No. 62/458,227, filed on Feb. 13, 2017.

(51) Int. Cl.
| *B65G 54/02* | (2006.01) |
| *B65G 35/08* | (2006.01) |
| *H02K 41/03* | (2006.01) |
| *H02K 41/02* | (2006.01) |

(52) U.S. Cl.
CPC .......... *B65G 54/02* (2013.01); *B65G 35/08* (2013.01); *H02K 41/02* (2013.01); *H02K 41/031* (2013.01)

(58) Field of Classification Search
CPC .......... B65G 35/08; B65G 54/02; H02K 7/08; H02K 41/031; H02K 41/033; H02K 41/02
See application file for complete search history.

(56) References Cited

U.S. PATENT DOCUMENTS

| 8,397,896 | B2* | 3/2013 | Kleinikkink | B65G 43/00 198/345.3 |
| 8,827,071 | B2* | 9/2014 | van de Loecht | B65G 17/12 198/805 |
| 10,569,974 | B2* | 2/2020 | Neubauer | B65G 54/02 |
| 10,670,079 | B2* | 6/2020 | Kleinikkink | H02K 41/031 |
| 2015/0027860 | A1* | 1/2015 | Kleinikkink | B65G 21/2009 198/867.01 |

(Continued)

*Primary Examiner* — Gene O Crawford
*Assistant Examiner* — Keith R Campbell
(74) *Attorney, Agent, or Firm* — Gowling WLG (Canada) LLP; Neil W. Henderson

(57) ABSTRACT

A linear motor conveyor system including: a track comprising a shaped guide rail; a plurality of moving elements, each moving element having: a body; at least two bearings supported by the body and configured to match with the shaped guide rail, wherein the bearings are mounted to the moving element such that the moving elements overlap along the direction of the track providing a reduced tooling pitch between the moving elements. A moving element for moving on a track of a conveyor system, the moving element including: a first set of bearings shaped to match with a first shaped guide rail; a second set of bearings configured to abut against a second guide rail; and a body supporting the first and the second bearing, wherein the body is shaped to allow the first bearing to at least partially overlap the body of an adjacent moving element.

13 Claims, 12 Drawing Sheets

(56) References Cited

U.S. PATENT DOCUMENTS

2019/0100389 A1* 4/2019 Neubauer ................ H02K 7/08
2019/0389675 A1* 12/2019 Kleinikkink ............. H02K 7/08

* cited by examiner

LINEAR MOTOR CONVEYOR SYSTEM AND MOVING ELEMENTS THEREFOR PROVIDING A REDUCED TOOLING PITCH

RELATED APPLICATIONS

This application claims priority to U.S. Patent Application No. 62/458,227 filed Feb. 13, 2017, which is hereby incorporated by reference.

FIELD

The present disclosure relates generally to conveyor systems for supporting moving elements and, more particularly to a conveyor system and moving elements therefor providing for a reduced tooling pitch.

BACKGROUND

In conventional linear motor systems, a moving element is controlled to move along a track by electromotive force. In a moving magnet linear motor, the moving element generally includes a magnet and the track includes an electromagnetic field generator. The moving element is placed on the track such that the magnet is acted on by the electromagnetic field in order to move the moving element along the track. In order to allow for smooth movement, the moving element generally has bearings which run along the track and the moving element is supported by guides or guide rails or the like on the track. The guide rails may, for example, engage with the bearings or with the moving element itself. The bearings may include plain bearings, ball bearings, needle bearings, roller bearings, wheel bearings and the like.

In linear motor systems, forces, including acceleration, on the moving element can be high in order to move or stop the moving element quickly in order to increase production speeds. In this environment, the moving elements tend to be larger in a direction of travel along the track to provide extra stability against the applied forces. However, this larger pallet size can result in a larger tooling pitch (i.e. the distance between items placed on moving elements and/or between moving elements themselves). Alternatively, the moving element may require larger or enclosing guide rails to help to counteract the forces.

In some cases, a ratio of wheel width spacing (e.g. distance between bearings/wheels along the direction of the track) to height spacing (e.g. distance between the guide rail and the centerline of the driving motor (central point of the thrust or, in some cases, center of mass of the moving element)) can have an impact on stability. A reduction of this ratio may produce moving elements that are less stable and therefore have limitations with acceleration, velocity, precision, payload, cantilever, longevity or the like.

In some conventional bearing systems, as noted above, guide rails are provided to physically engage with either the moving element or the bearings in order to provide stability. These conventional bearing systems typically require mechanical disassembly of either or all of the moving element, the bearings, or the guide rails in order to remove the moving element from the track. These types of systems may also require preloading or tight manufacturing tolerances on the guide rails and bearings in order to achieve precise movement and positioning and avoid binding.

Therefore there is a need for a linear motor conveyor configured to accommodate a more compact tooling pitch between moving elements while also providing stability and ease of handling of the moving elements.

SUMMARY

According to one aspect herein, the present disclosure provides a linear motor conveyor system including: a track comprising a shaped guide rail; a plurality of moving elements, each moving element having: a body; at least two bearings supported by the body and configured to match with the shaped guide rail, wherein the bearings are mounted to the moving element such that the moving elements overlap along the direction of the track providing a reduced tooling pitch between the moving elements.

In some cases, the guide rail may have a plurality of guide rails and the bearings are configured such that different bearings can run on different guide rails to allow the bearings and moving elements to overlap.

In some cases, the track may have a second guide rail and the moving element may include: a second set of bearings configured to abut against the second guide rail; and a bearing suspension system configured to provide a suspension to the second set of bearings.

In some cases, the bearing suspension system may include a thinned body of the moving element configured to bias the second set of bearings towards the second guide rail.

In some cases, the bearing suspension system may include a vertical rotary axis configured to allow the second set of bearings to pivot in relation to the second guide rail.

In some cases, the bearing suspension system may include one or more of the bearings in the second set of bearings having a hollow area in the interior of the bearing.

In some cases, moving element may include: at least one magnet; a cover positioned over the at least one magnet; a body gasket positioned between the cover and the body of the moving element; and a plurality of bearing gaskets positioned between each bearing and the body of the moving element.

In some cases, each moving element may also include: a second set of bearings configured to abut against a flat guide rail of the linear motor conveyor system; and a bearing suspension system configured to provide suspension to the second set of bearings.

In some cases, the bearing suspension system may include a pair of arms, wherein each arm is configured to support a bearing of the second set of bearings and bias the bearing toward the second guide rail.

In another aspect detailed herein, there is provided a moving element for moving on a track of a linear motor conveyor system, the moving element including: at least one magnet for interacting with a linear motor of the track to move the moving element using electromagnetic forces; a first set of bearings shaped to match with a first shaped guide rail of the track; a second set of bearings configured to abut against a second guide rail of the track; and a body supporting the first bearing and the second bearing, wherein the body is shaped to allow the first bearing to at least partially overlap the body of an adjacent moving element.

In some cases, the moving element may include a bearing suspension system configured to provide a suspension to the second set of bearings.

In some cases, the bearing suspension system may include a thinned body of the moving element configured to bias the second set of bearings towards the second guide rail.

In some cases, the bearing suspension system may include a vertical rotary axis configured to allow the second set of bearings to pivot in relation to the second guide rail.

In some cases, the bearing suspension system may include one or more of the bearings in the second set of bearings having a hollow area in the interior of the bearing.

In some cases, the moving element may include: a cover positioned over the at least one magnet; a body gasket positioned between the cover and the body of the moving element; and a plurality of bearing gaskets positioned between each bearing and the body of the moving element.

In some cases, the moving element may further include a bearing suspension system configured to provide suspension to the second set of bearings.

In some cases, the bearing suspension system may further include a pair of arms, wherein each arm is configured to support a bearing of the second set of bearings and bias the bearing toward the second guide rail.

In yet another aspect, there is provided a linear motor conveyor system including: a track having: a first guide rail having a shaped profile; a second guide rail having a flat profile; and a plurality of moving elements, each moving element having: a body; a first set of bearings supported by the body and configured to match with the shaped first guide rail, wherein the bearings are mounted to the moving element such that the moving elements overlap along the direction of the track providing a reduced tooling pitch between the moving elements; a second set of bearings configured to abut against a second guide rail of the track; and a bearing suspension system configured to provide suspension to the second set of bearings.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a linear motor conveyor system and moving elements with reduced tooling pitch adapted to travel on the conveyor system without the need for enclosing guide rails or the like. Generally, it is intended that the linear motor conveyor system and corresponding moving elements can achieve a tooling pitch of 75 mm or less, 50 mm or less, 25 mm or less while continuing to have performance, reliability, ease of handling moving elements and cost similar to moving elements having larger tooling pitches. In a particular case, the conveyor system may include at least one guide rail system having dual shaped rails and the bearings of the moving elements may be correspondingly shaped. It is intended that this may allow the bearing diameter to be increased to a size that would not compromise performance and reliability. The bearings may be provided to the moving elements such that adjacent moving elements' bearings overlap with one another.

For a conveyor system without guide rails that enclose the bearings as described herein, the torque that the moving element can handle is generally impacted by i) the pitch or spacing of the supporting wheels (also referred to as "wheel pitch") and ii) the distance the linear motor (or driving element) is away from the guide rails or wheels (also referred to as "rail offset"). In particular, this may be the distance from the centerline of the guide rail/wheels (because they counter the torque) to the centerline of the linear motor (or driving force/thrust). In some cases, this may be the distance the center of mass of the moving element is from the supporting wheels (also referred to as "wheel offset"). In some situations, the friction of the lower wheels may also contribute to taking up some of the torque and could be included in the calculations if necessary. The rail offset and the wheel offset are measured along the Z-axis (described herein). As the longitudinal wheel pitch decreases and/or the rail offset increases, the torque on the bearings/wheels about the Y-Axis increases (the Y-axis is perpendicular to the direction of travel and perpendicular to the track). As this torque on the bearings increases, acceleration, deceleration and payload are constrained to achieve stable motion. A way to evaluate this is the ratio of the wheel pitch to the rail offset. The higher this ratio is the higher the chance of stable motion while maintaining acceleration, deceleration, payload and cantilever at appropriate levels for efficient operation. A ratio of 1:1 and higher may enable stable performance. Ratios lower than 1:2 may constrain performance. Similar concepts apply to the ratio between wheel pitch and wheel offset.

Figure 1:
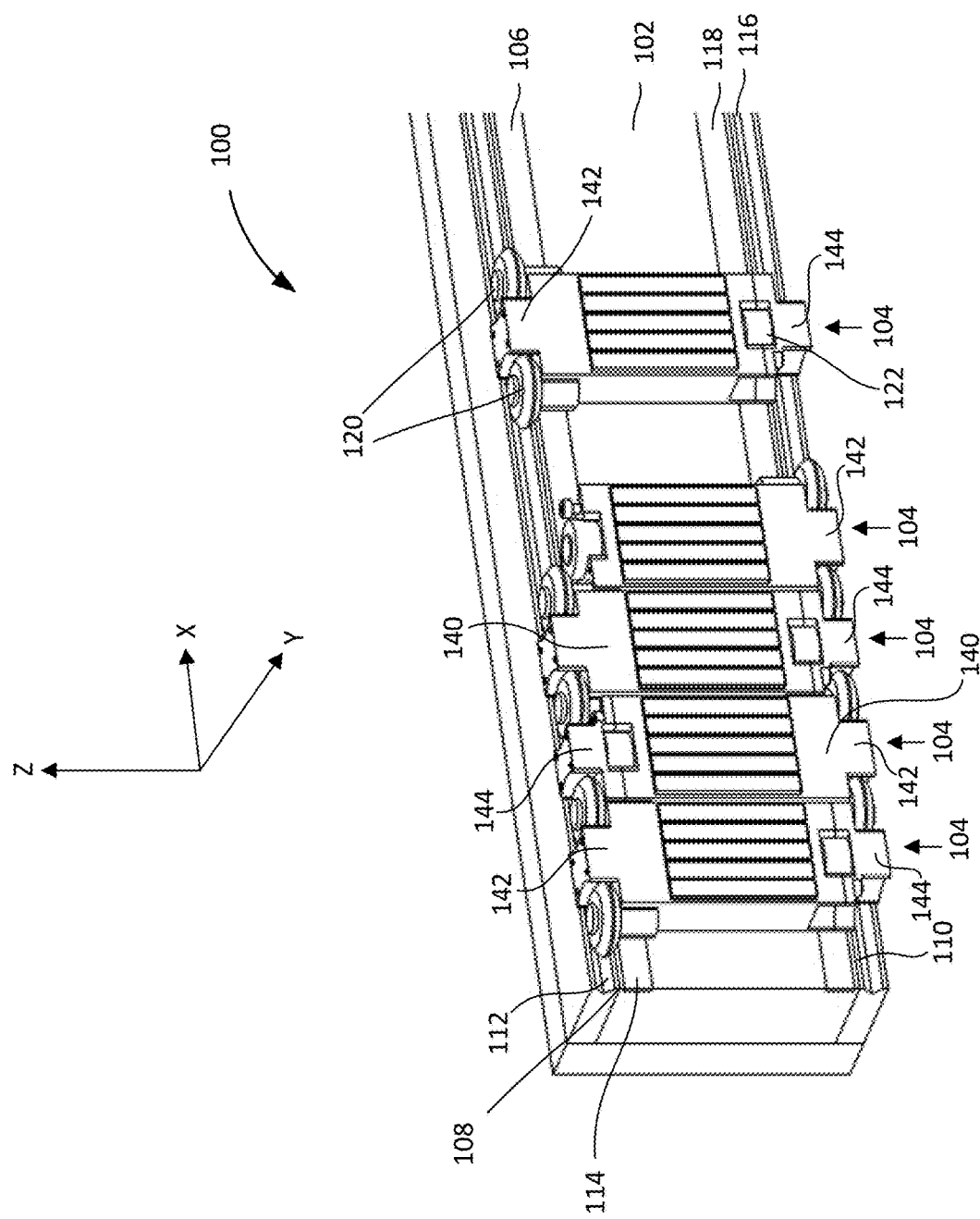
FIG. 1 is a track section of a conveyor system with a plurality of moving elements, in accordance with an embodiment.

FIG. 1 illustrates a conveyor system 100 having a track 102. The track 102 is configured to interact with one or more moving elements 104 (five of which are illustrated) which are configured to ride or travel along the track 102. Some of the principles of operation of a similar track 102 are described in more detail in U.S. Pat. No. 8,397,896 to Kleinikkink et al., which is hereby incorporated herein by reference.

In some embodiments, track 102 may be composed of a plurality of track sections (not shown) which are mechanically self-contained and separable from one another so as to be modular in nature. In this case, the track sections may be mounted on a support (not shown) so as to align and abut one another in order to form the track 102. In order to be modular, each track section may house self-contained electronic circuitry for powering and controlling the track section.

The conveyor system 100 includes a track surface that produces a magnetic force for moving the moving element 104 along the track 102. The magnetic force also captures the moving element 104 on the track 102. The magnetic force is created by the interaction of the magnetic flux created by coils (not shown) embedded under the track surface and magnetic elements of the moving element 104. The magnetic force can be thought of as having a motive force component for directing movement of the moving element 104 along an X axis 130 (direction of travel) on the track 102, a capturing force component to hold, on a Y axis 132 (laterally), the moving element 104 on the track 102 and in spaced relation to the track surface. There is also a Z axis perpendicular to both the X and Y axes. In at least some conveyor systems, the motive force and the capturing force is provided by the same magnetic flux.

The track surface includes a first guide rail 108 and a second guide rail 110 configured to support the moving element 104. The first and second guide rails 108, 110 are configured such that the moving element 104 may be removed from the track surface when the magnetic force is overcome. The magnetic force is overcome, for example, where a user pries the moving element 104 away from the track surface. In an alternative, the moving element 104 may be removed from the track surface where the magnetic force is reversed, reduced, or removed.

The first guide rail 108 supports at least some of the moving elements 104 horizontally while it may support other moving elements 104 horizontally and vertically. In particular, the first guide rail 108 has a "V" shaped profile 112 adjacent to a smooth surface 114 with a flat profile. It is intended that the "V" shaped profile 112 will support and guide some of the moving elements 104 horizontally and vertically while the flat profile will support other moving elements horizontally. The second guide rail 110 has a similar structure in that it includes a "V" shaped profile 116. (in this case, on the outer side or bottom of the guide rail) and a smooth flat surface 118 (in this case, on the inner side or on top of the "V" shaped profile). It will be understood that rails having an alternate shape (i.e. other than "V" shaped) may be used with corresponding wheels or bearings on the moving elements.

Each moving element 104 has at least one shaped bearing or wheel 120, wherein the profile of the wheel is configured to correspond to the shaped profile of the first and second guide rails. Each moving element 104 further includes at least one flat wheel 122. In this embodiment, the moving element 104 includes a set of shaped wheels 120. It is intended that the dual sets of guide rails 108, 110 allow for the shaped wheels 120 to overlap as between adjacent moving elements. It is intended that, by providing the dual tracks on each guide rail, and allowing the moving elements to have some overlap, the conveyor system 100 may provide a reduced tooling pitch between moving elements. In particular, the tooling pitch is expected to be in a range between 50 mm and 75 mm while the wheels in the moving element include an outer dimension of at least 80 mm.

As noted above, the torque that the moving element can handle can be impacted by i) the pitch or spacing of the V-wheels and ii) the distance the linear motor (or driving element) is away from the V-rails. As the V-wheel pitch decreases and/or the distance between the V-rails and the driving element increases, the torque on the bearings about the Y-axis increases (the Y-axis is perpendicular to the direction of travel). As this torque on the bearings increases, acceleration, deceleration and payload are constrained to achieve stable motion. In the present embodiment, the goal is to obtain a ratio of 1:1.

The following provides for an example of how the ratio may be obtained:

With overlapping wheels it has been determined that a ratio of 1:1 can be achieved at a tooling pitch of 50 mm and wheel diameter of 30 mm. This 1:1 ratio enables stable motion at desired performance. A wheel diameter of 30 mm at the 1:1 ratio provides for a more robust operation.

In contrast, if the wheels didn't overlap, the ratio would be approximately 3:5 for a 50 mm tooling plate pitch and 30 mm wheels. This ratio would constrain the maximum torque the moving carrier could handle limiting acceleration, deceleration and payloads below desired levels. In order to obtain a 1:1 ratio without overlapping, wheel diameter would be reduced from 30 mm to 18 mm to achieve a 50 mm tooling pitch.

One of the reasons to maintain a larger wheel diameter is that, at the 30 mm wheel diameter, standard rotary bearings can still be used. As an example, bearings of the size "10 mm ID/19 mm OD/5 mm height" can be used. This is at the lower end of standard rotary bearing sizes that are cost effective with multiple options available for shielding, sealing and payload ratings. Bearings for smaller wheels, such as 18 mm diameter, become more delicate, are not as robust for industrial applications, have higher contact stresses and have fewer options for sealing and shielding. These are typically magneto bearings with lower payload ratings. Smaller diameter wheels also generally don't roll over rail joints as well as larger wheels. So in addition to the poor stability ratio, the resulting smaller wheels can also constrain performance and reliability.

FIG. 1 illustrates an embodiment with a single flat profile wheel but it would be understood that a moving element with a set of flat wheels could also overlap with adjacent moving elements.

In this embodiment, the moving elements 104 can be oriented in pairs, such that the wheels with the shaped profile of the first moving element are located on the first guide rail and the wheels with the shaped profile of the second moving element are located on the second guide rail. This pairing system allows for the flat profile wheel of the first moving element to be located on the second guide rail and the flat profile wheel of the second moving element would be located on the first guide rail. Generally, each moving element 104 has a pallet body 140 shaped to allow the wheels 120, 122 of an adjacent moving element 104 to overlap. In this embodiment, the pallet body 140 has a rectangular shape with a first pallet support projection 142 between the wheels 120, and a second pallet support projection 144 near the wheel 122. As shown, each moving element can be inverted compared to the adjacent moving element. Accordingly, the second pallet projection 144 of one moving element is located between the wheels 120 of two adjacent moving elements in an overlapping arrangement.

The wheels, bearings, shafts and other mechanical components are intended to be robust and can operate at high performance and reliability while the conveyor system achieves a compact tooling plate pitch of approximately 75 mm or lower, approximately 50 mm or lower, approximately 25 mm or lower, including any intervening pitches.

Figure 2:
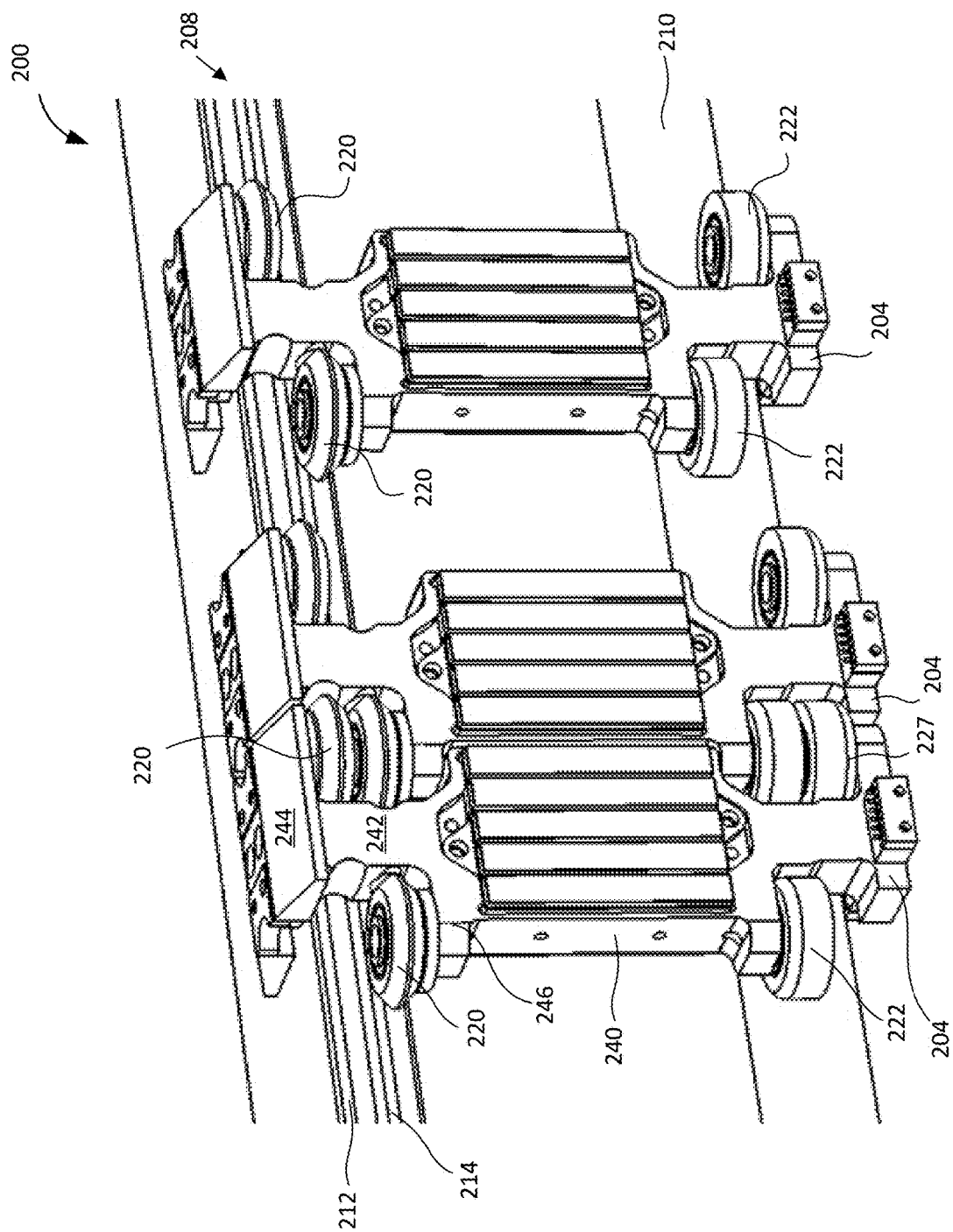
FIG. 2 is a track section of a conveyor system with a plurality of moving elements, in accordance with another embodiment.

FIG. 2 illustrates another embodiment of a conveyor system 200 and moving elements having a reduced tooling pitch. In this embodiment, a first guide rail 208 may include two shaped portions 212 and 214 that are adjacent to each other and in this case, at a top side of a track. A second guide rail 210 may be a flat rail provided opposite to the first guide rail 208, in this case, at the bottom of the track 202. The second guide rail is intended to be sufficiently wide to allow the guide rail to accommodate two offset wheels or bearings.

The moving element 204 may include two sets of wheels or bearings. The first set of bearings 220 rides on the first guide rail 208. The first set of bearings 220 has an edge profile that corresponds to the profile of the first guide rail 208. In this embodiment, the first set of bearings 220 has a "V" shaped profile that matches the opposite "V" shape profile of each of the portions 212 and 214 of the first guide rail 208. The first set of bearings 220 may alternately have a "U" shaped profile or another appropriately shaped profile intended to support the moving element 204 along a Z axis. It is intended that the first set of bearings 220 may be offset to allow one bearing to be accommodated in the first portion 210 of the first guide rail 208 and a second bearing to be accommodated in the second portion 214 of the first guide rail 208.

The second set of bearings 222 rides on the second guide rail 210. The second set of bearings 222 is intended to have an edge profile that corresponds to the profile of the second guide rail 210. In an embodiment, the second set of bearings has a flat profile (e.g., a flat wheel) that matches the flat profile of the second guide rail 210. The second set of bearings 222 may include two offset bearings which may roll a bit higher or lower on the second guide rail 210 to adapt to any non-parallelism with the first guide rail. In some cases, the second set of bearings 222 may be a single bearing centrally located on each moving element and configured to engage the second guide rail 210.

In this example embodiment, the moving pallets 204 may all be oriented in the same direction yet continue to overlap with neighboring moving elements on either side. For example, the moving element 204 has a pallet body 240 with a pallet support projection 242 and an overhang 244 with one wheel 220 supported below the overhang 244. The pallet body also has a shoulder 246 with the other wheel 220 supported above the shoulder 246. The wheel 220 on the overhang 244 of one moving element 204 overlaps the wheel 220 on the shoulder 246 of an adjacent moving element 204. As the offset wheels allow for the overlap of the moving elements, the conveyor system 200 is able to achieve a reduced tooling pitch, which may be in a size range as noted herein.

In the embodiment shown in FIG. 2, the moving element 204 has two offset "V" shaped bearings 220 and two offset flat bearings 222. The two flat bearings 222 and the two V-shaped bearings 220 (four bearings in total) may provide increased stability in rotation about X, Y and Z axes. This may allow payloads mounted to the moving element 204 that have higher cantilever than a three bearing configuration. With four bearings 220, 222, the center of gravity of an added payload that is mounted to the moving element 204 may also be shifted farther away from the track while maintaining stability.

It will be understood that overlapping profiled bearings and/or overlapping moving elements may require a dual shaped guide rail. Manufacturing tolerances in a dual shaped rail may cause some precision variability over a single common shaped rail. In some cases, having both shaped portions on the same guide rail (as in FIG. 2) may make manufacturing to acceptable tolerances easier than having a shaped profile on each of separate guide rails (as in FIG. 1). Having both shaped profile portions on the same rail may also make joint alignment easier as both shapes will be aligned together. Further, there may be reduction in stack up tolerance by having both shaped profile portions close together and on the same side of the motor.

Figure 3:
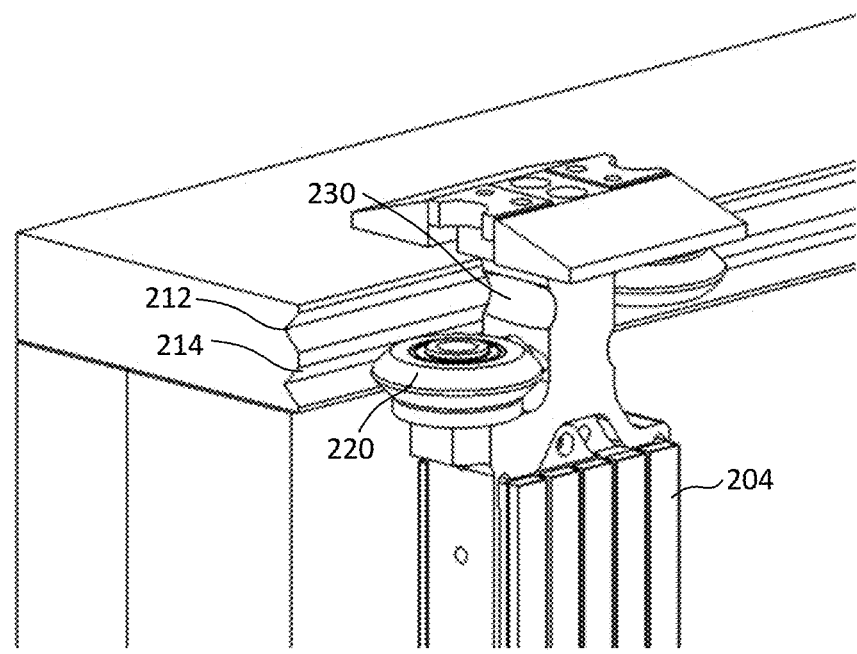
FIG. 3 illustrates the guide rails that may be used for the embodiment illustrated in FIG. 2.

FIG. 3 illustrates the first guide rail of FIG. 2 in further detail. Allowing for the overlapping bearings or wheels is intended to provide for a smaller tooling pitch while enabling a bearing solution that can be sized to handle the forces and demands of a linear motor conveyor. Having dual portions in at least one guide rail is intended to allow for the bearings/moving elements to overlap.

As shown in FIG. 3, the moving element 204 may include a set of offset shaped bearings 220 configured such that the shaped bearings overlap with a neighboring moving element and its bearings. The moving element may further include an indent 230 (such as a groove, or the like), intended to provide further accommodation for the bearing of the neighboring moving element. It is intended that having dual shaped rails may provide increased stability over a single shaped rail.

It will be understood that the embodiments shown in FIGS. 1 and 2 provide different methods of overlapping the bearings and/or moving elements in order to bring the moving elements closer together and thus reduce tooling pitch while maintaining the stability of the moving elements on the track without adding guide rails for enclosing or otherwise holding the moving element onto the track.

Figure 4:
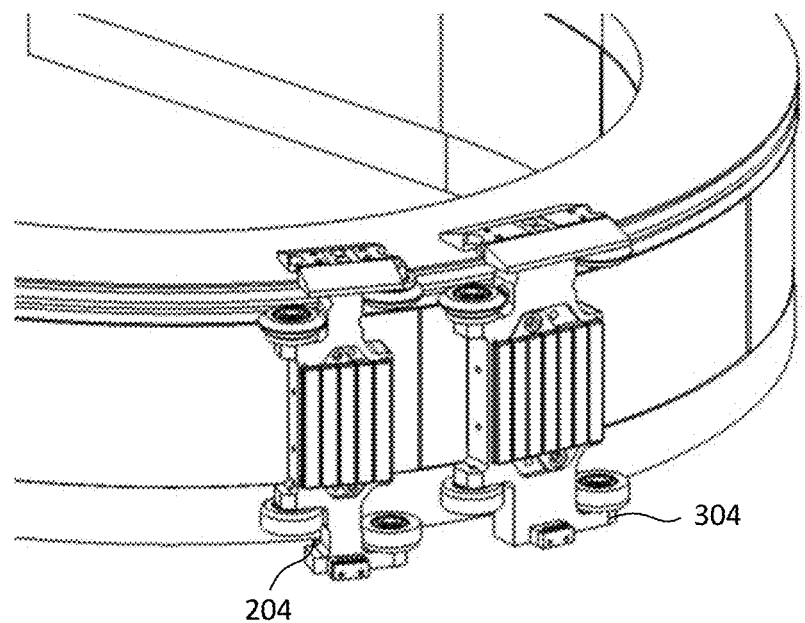
FIG. 4 illustrates a curved section of a conveyor system with a plurality of moving elements.
Figure 5:
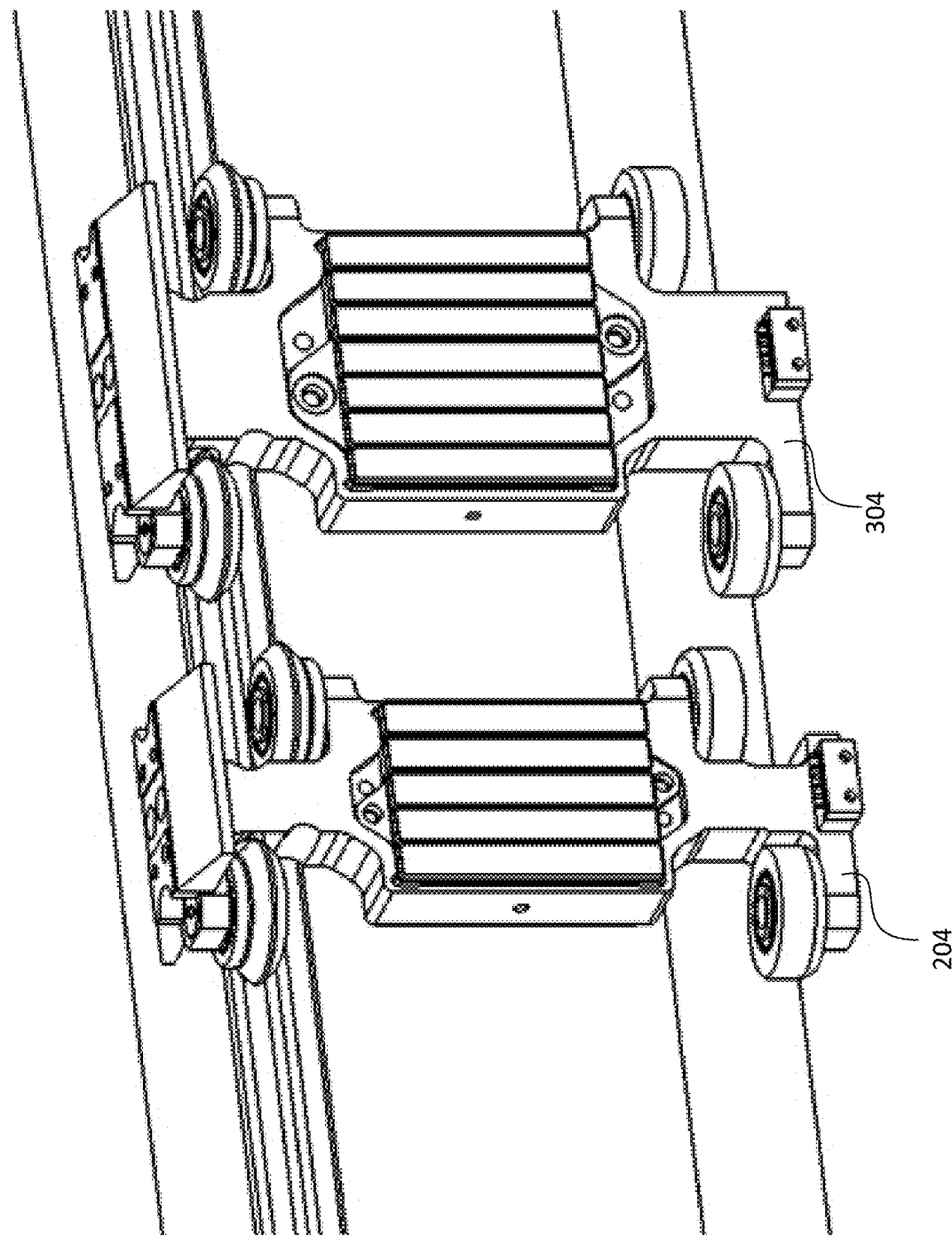
FIG. 5 illustrates a track section with two separate embodiments of moving elements.

FIGS. 4 and 5 illustrate an alternative embodiment that is intended to support different bearing spacing on the moving elements with common rails and common linear motors. In particular, FIG. 4 illustrates a common curved rail while FIG. 5 illustrates a common straight rail. A linear motor conveyor may be used for a wide range of applications wherein some applications may benefit from a smaller tooling pitch of for example, approximately 75 mm or less, while other applications may benefit from a larger tooling pitch, for example, for wider parts or multiple parts per moving element. Accommodating various dimensions of moving elements may further provide for increased stability to support loads of varying weights and/or loads with varying cantilevers. Conventional mechanical solutions that support wheels with both narrow and wider spacing can be problematic on curves as the motor to magnet gap (that is, distance between the motor on the track and the magnet on the moving element, sometimes called the "air gap" or "magnet gap") changes with the wheel spacing of the moving element. It can be a costly solution to provide multiple curved motors and/or curved rail profiles for various wheel spacings (and the related tooling pitches).

FIGS. 4 and 5 illustrate a first moving element 204, which is configured to provide for a smaller tooling pitch and a second moving element 304 which is configured to provide for a larger tooling pitch. Each moving element includes a first set of shaped bearings 220 and a second set of flat bearing 222. Each set of bearings 220 and 222 are offset on each moving element and are intended to overlap with neighboring moving elements. The first moving element 204 may be a smaller width than the second moving element 304.

In FIG. 4, the rail curve profiles may be determined to allow for adequate clearance for the magnet gap for the moving element with the widest wheel gap 304, while the moving element 204 with the narrower wheel profile may have a larger magnet gap. For example, a magnet gap of between 1 mm to 3 mm is typically acceptable with a smaller gap being better for performance. The lower end of the range is determined by the precision and tolerances of the manufacturing while the higher end relates to the ability of the track to keep the moving element engaged and operating correctly when subject to higher forces. As long as the magnet gap is maintained at an appropriate distance, a range of sizes of moving elements may be used on the same rail curve.

In another case, the curve profile of the linear motor conveyor track may also be optimized to share the magnet gap variation and the guide rail profiles may be adapted to a common motor. In yet another case, the motor may be shifted relative to the guide rails to provide for a magnet gap for different bearing spacing. For example, for an "out" turn the motor may be shifted out relative to the guide rails as the spacing between the bearings decreases.

In yet another case, common motor and rail parts may be used whenever the curve radius exceeds a predetermined threshold and replacement parts may be used in curves where the radius is below the predetermined threshold. In this case where a replacement part is needed, the motor, guide rails, or both may be replaced in the curves with lower radii based on the bearing spacing of the moving elements. Replacing parts only on curves with a radius below the predetermined threshold may only be a small subset of the total parts and thus represent a cost savings over replacing the complete linear motor conveyor or having multiple conveyors each with a single size of moving elements. This type of solution is intended to be available for "in" turns, "out" turns or other curves on the track sections.

For example, in the case of two types of moving elements, a first type with 75 mm tool pitch and a second type with 50 mm tool pitch, each having V-rails and bearings and operating on the same track (similar to that shown in FIG. 2), the following chart illustrates the magnet gap depending on curve radius:

| Effective Curve Radius | Gap differential between 50 mm and 75 mm V-wheel pitch | Are common curve parts viable? |
| --- | --- | --- |
| 767 | 0.5 | Yes |
| 377 | 1 | Yes |
| 183 | 2 | On the threshold |
| 145 | 2.5 | Potential performance loss for common parts |
| 120 | 3 | Replacement parts likely needed |

As shown, as the air gap gets larger, there is a compromise because both the magnetic thrust to move the moving element and the magnetic attraction to hold the moving element on the track are negatively impacted. It will be understood that similar considerations can be used to determine the appropriate magnet gap for other types of rails and bearings.

In another case, the profile of the magnets of the moving element may be modified based on the spacing of the set of bearings. In particular, magnets closer to the centerline could be recessed on moving elements with a wider bearing spacing to reduce magnet gap various on the outside curves. Although, this solution may provide benefit for out turns, it may not aid in in turns so may only be feasible in linear motor conveyor systems which rely solely on out turns.

It is intended that the solutions provided above allow for common linear motor parts to support various bearing spacing and sizes of moving elements. The motor curve profiles are intended to be a compromise between smallest and largest spacing to optimize the magnet gap. It is further intended that the rail curve profile may also be a compromise between the smallest and largest bearing spacing to optimize the magnet gap. Further the profile of the magnets on the moving element may be modified to optimize the magnet gap. It will be understood that all or a subset of these solutions may be employed.

Figure 6A:
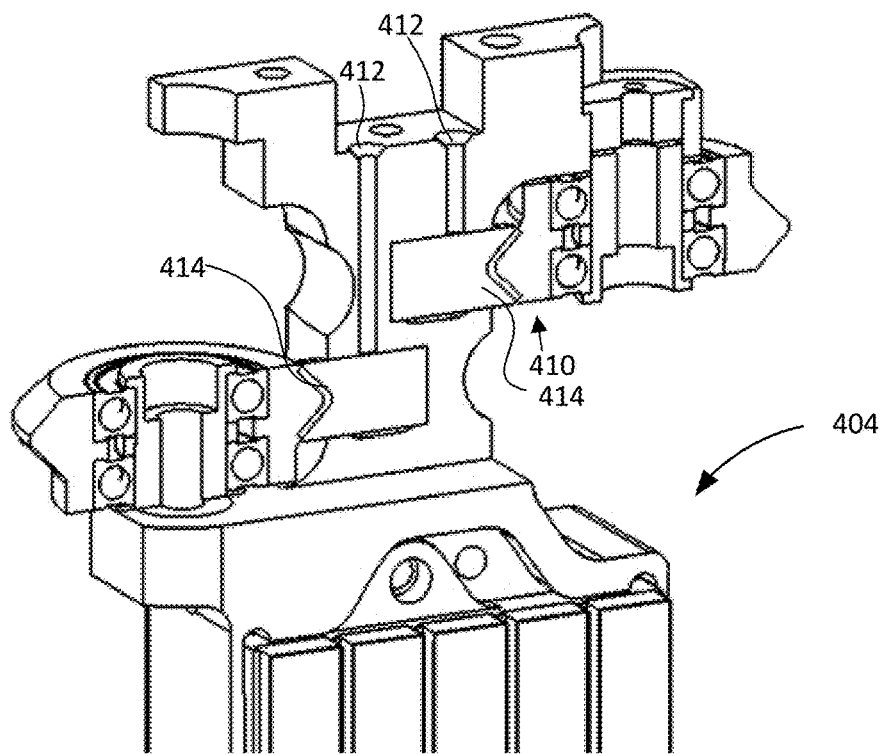
FIGS. 6A and 6B illustrate a cross section and perspective view of a moving element according to an embodiment.
Figure 6B:
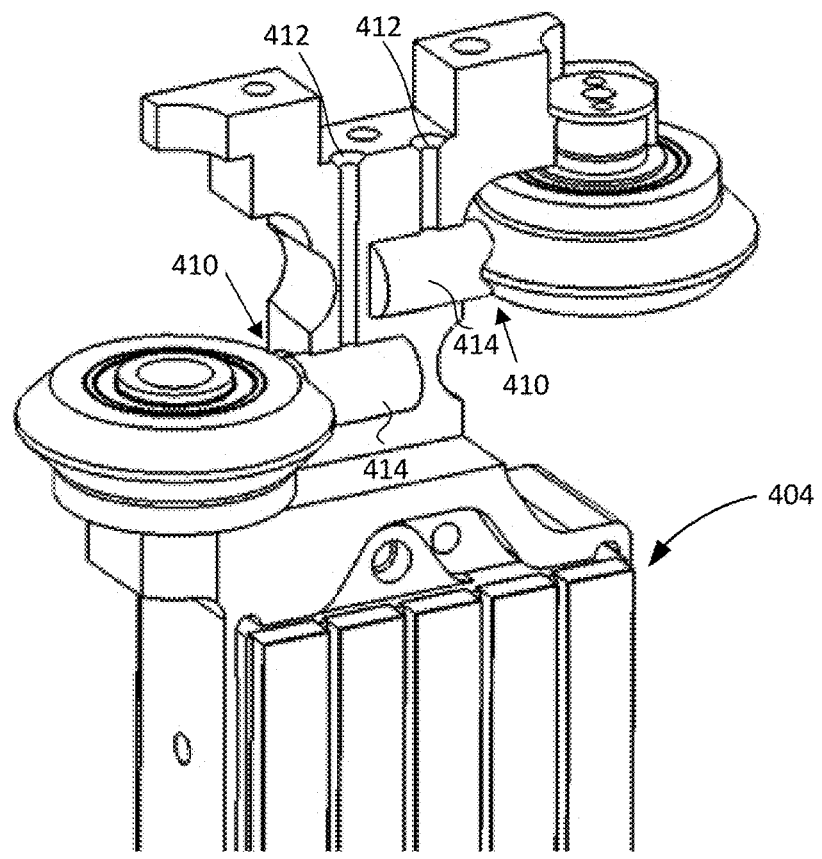

FIGS. 6A and 6B illustrate partial cross sectional views of an embodiment of a moving element 404. The moving element 404 may include a lubrication system 410. It is intended that the lubrication system 410 may reduce wear and tear on the shaped bearing in connection with shaped guide rails. Each bearing may be provided with a lubrication system. The lubrication system may include a lubricant inlet 412, a lubricant storage area, and an absorbent material 414. In some cases, the adsorbent materials may be shaped to match with and be adjacent to the bearing. In this case the lubricant, for example oil, may be added to the lubricant inlet 412, stored in the storage area, and absorbed by the absorbent material 414. The absorbent material 414 may then apply the lubricant to the bearing. In some cases, the lubricant storage may be made up of the absorbent material rather than being a container for the lubricant. In FIGS. 6A and 6B, there are two lubricant systems (inlets, storage, absorbent material) shown but it will be understood that other embodiments may include variations such as a system that includes a single inlet, single storage, or the like.

Figure 7A:
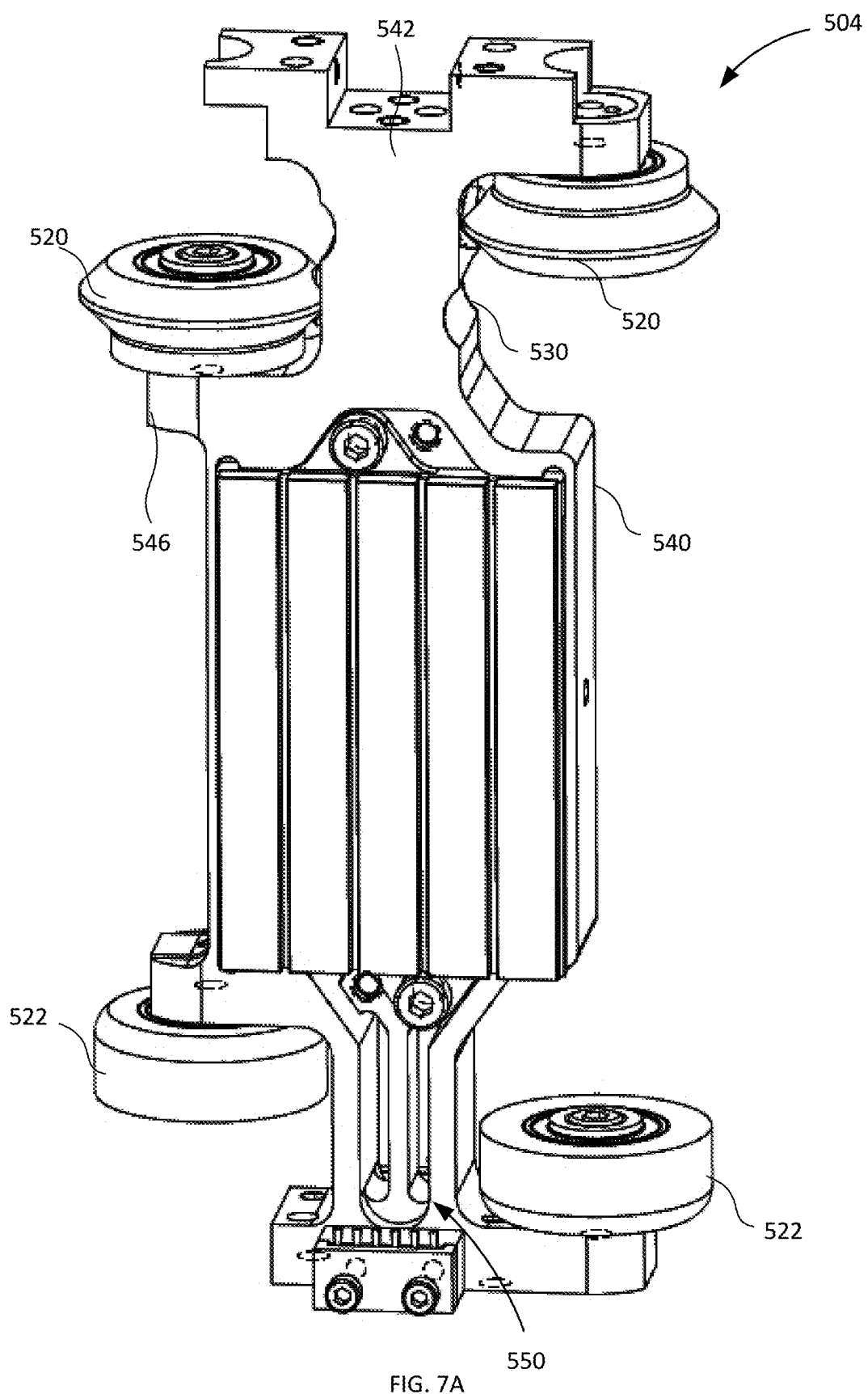
FIGS. 7A to 7C illustrate a perspective view and internal views of a moving element according to another embodiment.
Figure 7B:
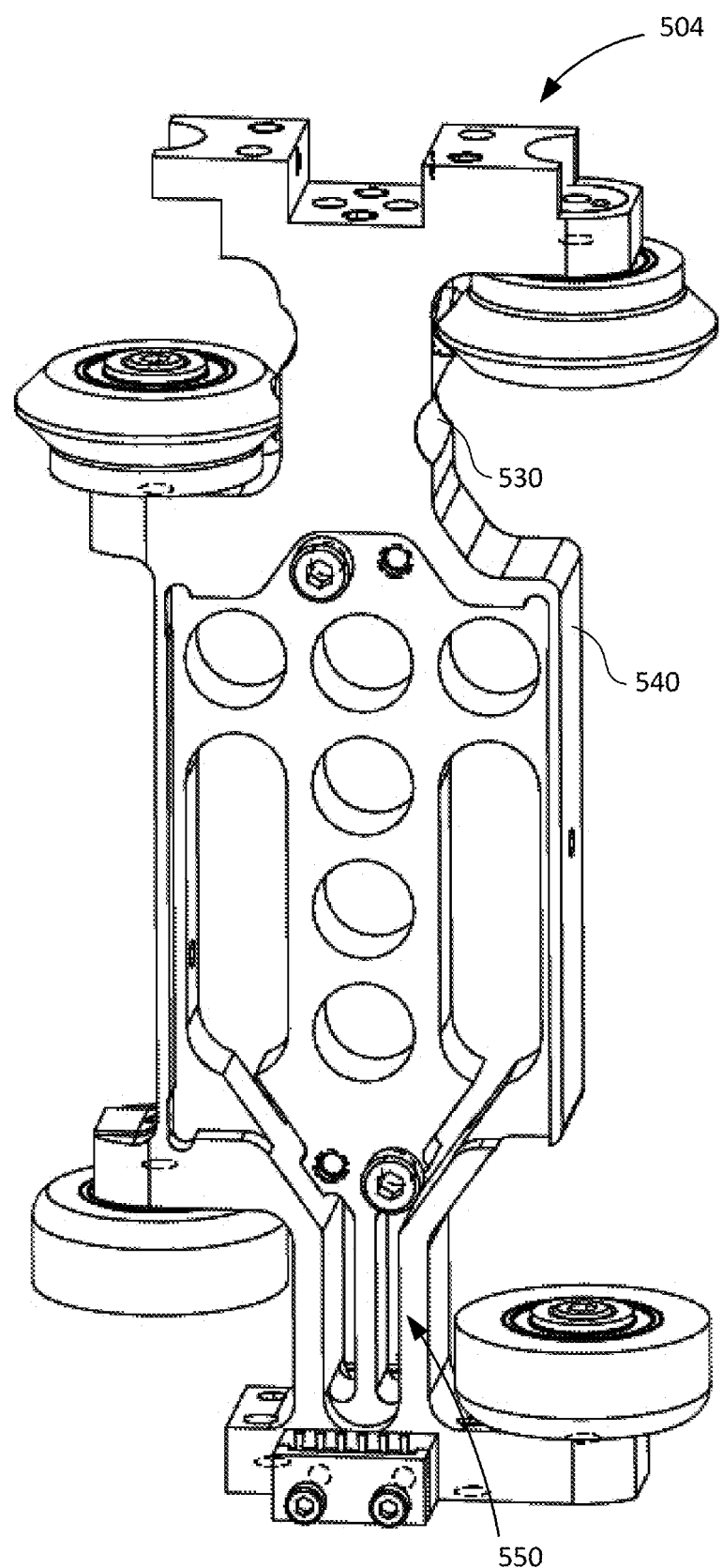
Figure 7C:
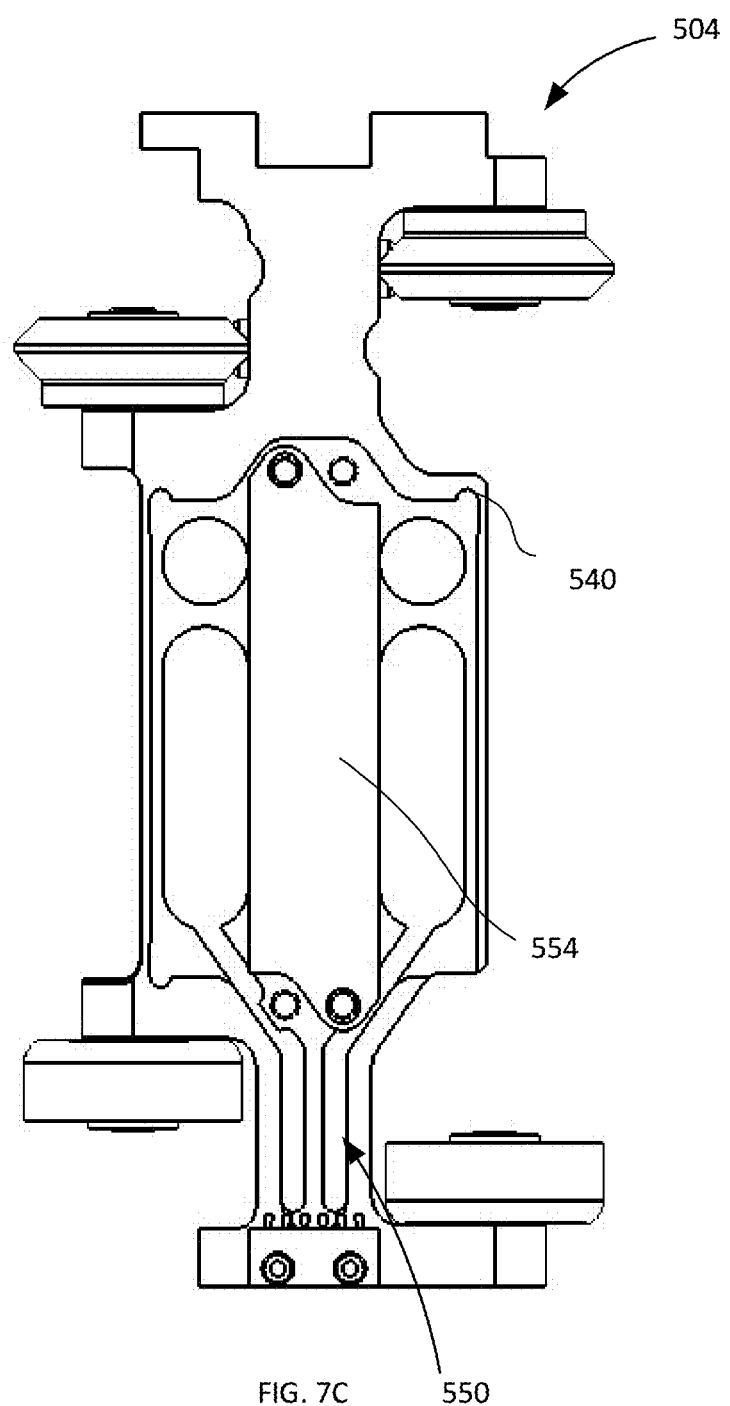

FIGS. 7A, 7B and 7C illustrate a front view and internal view of an embodiment of a moving element 504. As in previous embodiments, this embodiment of the moving element 504 has two sets of bearings, a first set of bearings 520, which rides on the first guide rail 208 and a second set of bearings 522, which rides on the second guide rail. The first set of bearings 520 may include a shaped profile that matches the opposite shape profile of the first guide rail. The first set of bearings may be offset, with one wheel being supported by a pallet support projection 542, or the overhang thereof, while the other wheel may be supported above a shoulder 546 of the moving element. The moving element may include a body 540 having a plurality of grooves or indents 530, which are intended to provide an area for the bearing of a neighboring moving element.

In some cases, it was found that adding a suspension (for example, some flexibility) to the moving element provided for a smoother movement of the moving element around the track and, in particular, to allow for potential misalignment of the bearings with the rails due to magnetic forces or other factors. To achieve the flexibility, a bearing suspension system 550 was provided to the second set of bearings 522. The bearing suspension system 550, for example, a biasing wheel suspension, can allow for the second set of bearings 522 to maintain more consistent contact with the second guide rail during movement around the track. In some cases, the bearing suspension system 550 may be provided by adapting the body 540 of the moving element, such as by thinning the body or cutting out portions of the body. In some cases, a center area of the body 540 may be separated from the outer sides to provide for the movement of the bearing suspension system 550. As shown in FIG. 7C, in some cases, a shim 554 may be removably attached to the body to allow the second set of bearings 522 to flex independently of a magnet assembly 562 (FIG. 7A). The shim 554 may be narrow and attach near the center of the body 540 of the moving element 504. In some cases, the shim may have a thickness between approximately 0.25 to 1 mm. In a particular case, the shim 554 may be approximately 0.5 mm in width.

Other suspension/biasing options may be available, for example, the use of springs, elastics, or the like may be provided to the body 540. In some cases, the bearing suspension may be applied to both the first and second set of bearings, although it may be preferable to bias only the second set of bearings which is intended to provide for stability and repeatability for the first set of bearings.

Figure 8:
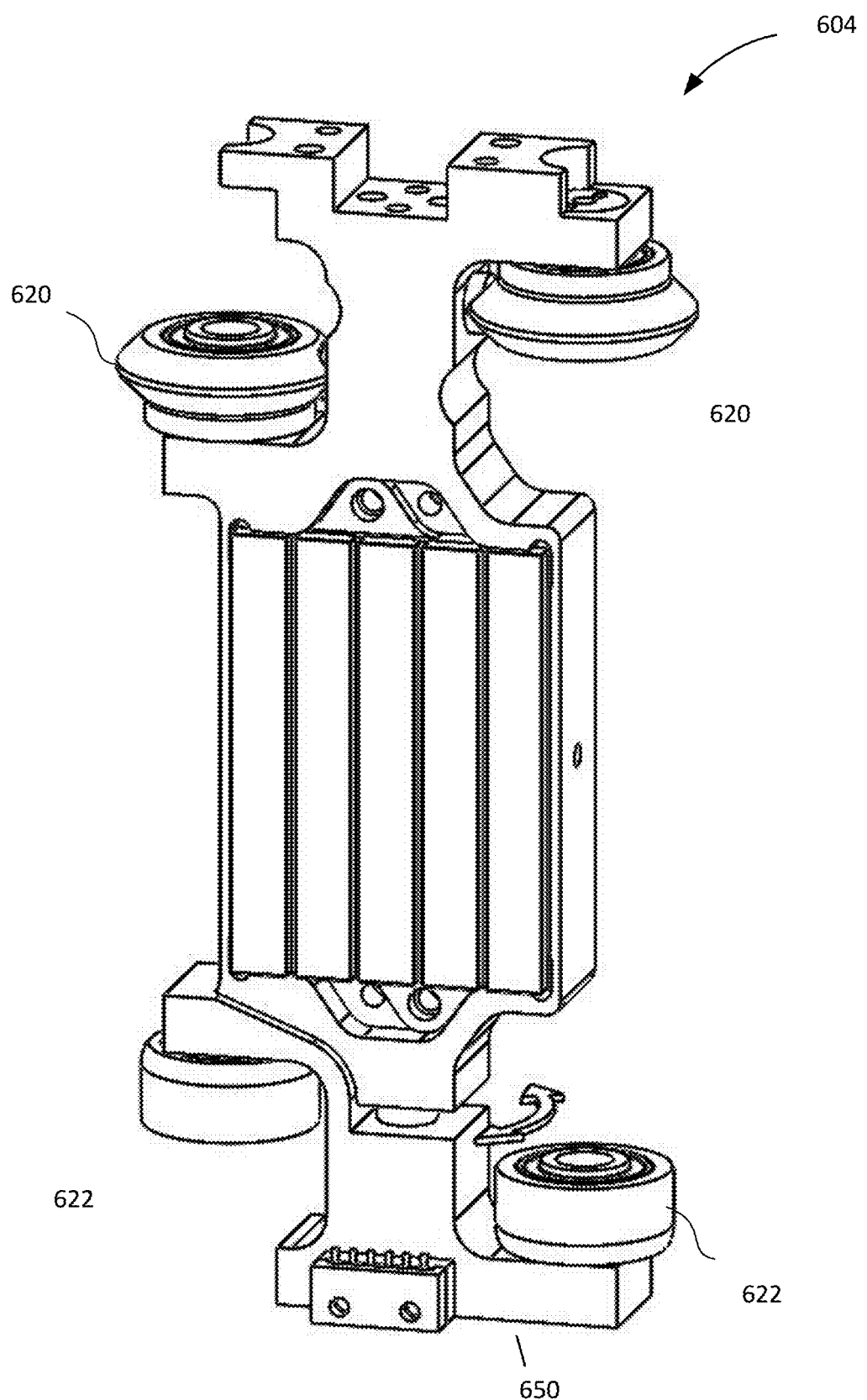
FIG. 8 illustrates a moving element according to yet another embodiment.

FIG. 8 illustrates another embodiment of a moving element 604. The moving elements has a first set of bearings 620 and a second set of bearings 622 supported by a body of the moving element 640. In this embodiment, the body of the moving element further includes an alternative bearing suspension system 650. The bearing suspension system 650 provides for a vertical rotary axis allowing the second set of bearings to pivot or rotate in relation to the body of the moving element 604. It is intended that this rotational movement may provide for improved contact with the guide rail while the moving element 604 is in transit. In some cases, the bearing suspension system 650 may be used with other bearing suspension systems described herein.

Figure 9A:
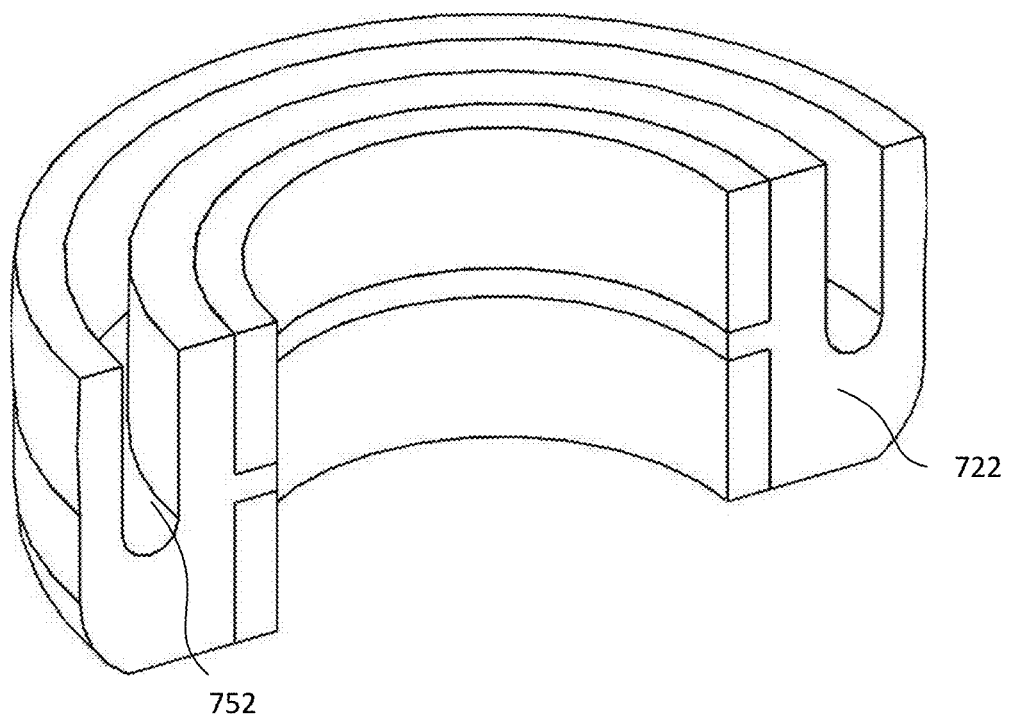
FIG. 9A illustrates a cross-section of a bearing which may be used in association with a moving element according to an embodiment.
Figure 9B:
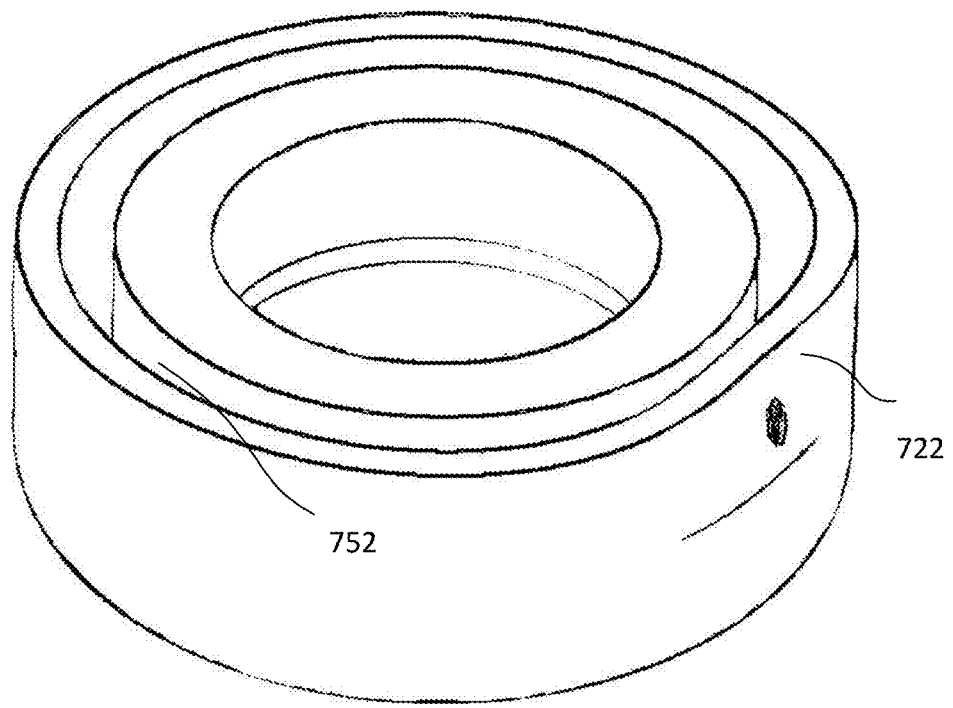
FIG. 9B illustrates a distortion plot for the bearing shown in FIG. 9A.

FIG. 9A illustrates a further alternative type of bearing suspension system. In this example, a wheel-type bearing 722 may include a hollow 752 that can provide some flexibility or compressibility to the wheel to provide a bearing suspension system. As shown, the flexibility or stiffness of the bearing may be defined by the thickness of an outer ring or lip of the bearing. The bearing 722 may also be used in addition to other bearing suspension systems described herein to provide further flexibility to the bearing suspension system and to generally allow the bearings a way to maintain greater contact with the guide rails. The depth and radial width of the hollow 752 may be dependent on one or more of the overall mechanics, geometry of the pallet and rail, amount of potential compliance difference, material properties and the like. The hollow is intended to be sized to accommodate any potential misalignment between the bearing and the guide rail, which may be caused by magnetic forces acting on the moving element. In a specific example, the potential misalignment may be expected to by 0.1 mm, and the radial width of the hollow may be at least 0.1 mm. In a specific case, the width of the hollow may be approximately 2 mm and the stiffness may be approximately 0.002 mm/N. FIG. 9B illustrates an exaggerated distortion plot of the bearing shown in FIG. 9A. This example allows for a force distribution of 25%/75% between two bearings.

Figure 10A:
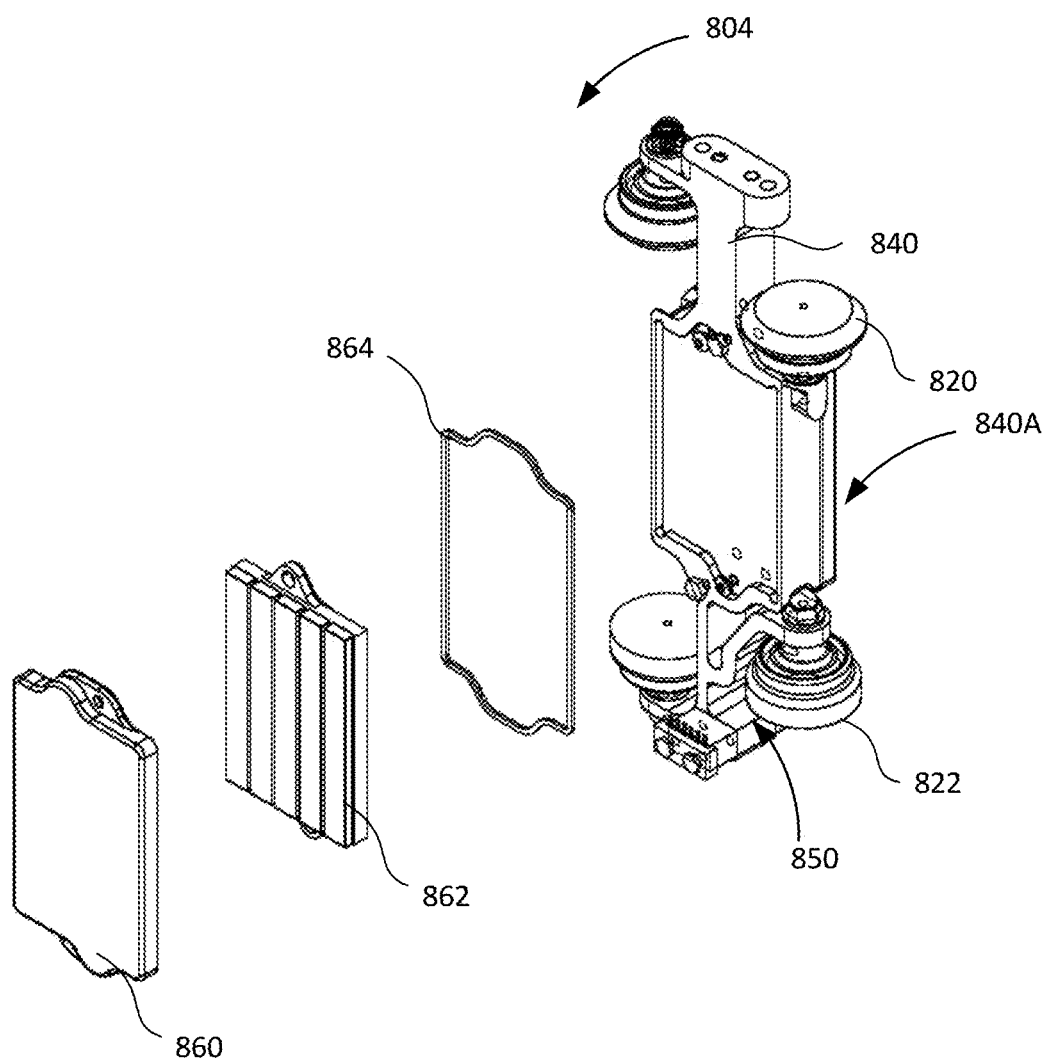
FIGS. 10A and 10B illustrate a perspective view and an internal view of a moving element according to yet another embodiment.
Figure 10B:
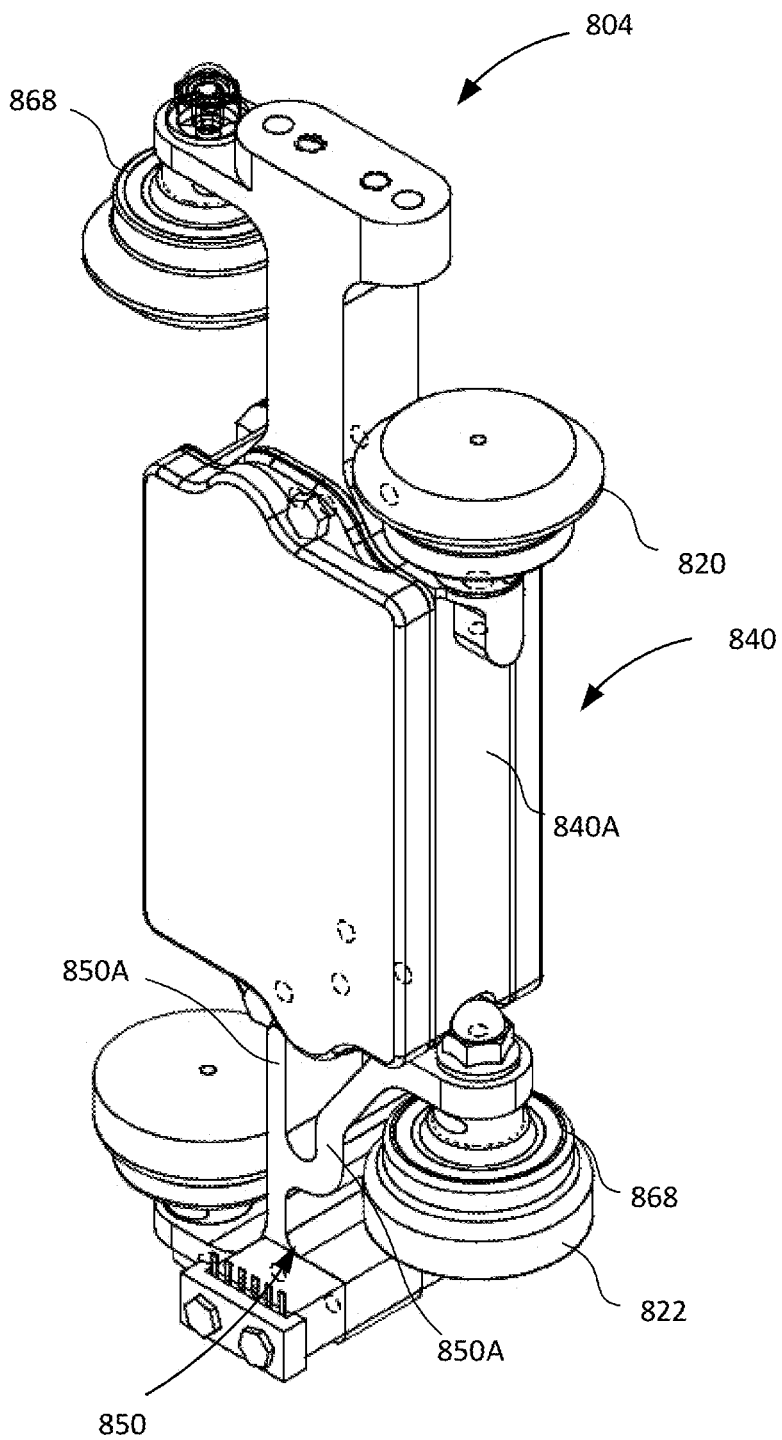

FIGS. 10A and 10B illustrate an exploded view and a perspective view of an alternative moving element 804. This particular embodiment includes features that may be used in a conveyor system in a clean or aseptic environment. For example, a cover 860 may be attached to provide an easy to clean surface and protect the environment from any contaminants, for example, dust, debris, bacteria or the like that may collect in the magnetic elements 862 of the moving element. The moving element 804 may have a solid central body 840A and a body gasket 864 may be provided to seal the cover 860 against the central body 840A to seal the magnetic element 862. These features can reduce or eliminate contaminants that may otherwise accumulate in or around the moving element 862 and require cleaning.

Similar to other embodiments, the moving element 804 may include a first set of bearings 820, which may include a shaped profile opposite to the shaped profile of the first guide rail. Further, a second set of bearings 822 are provided to contact with a second guide rail. The second set of bearings 822 are provided with a bearing suspension system 850, which can provide some suspension/flexibility to each bearing 822. The added flexibility is intended to provide for greater stability for the moving element 804 by having the second set of bearings maintain contact with the second guide rail during the travel of the moving element 804. In this embodiment, the bearing suspension system 850 is provided by having the bearings 822 mounted on thinner arms 850A, wherein each arm is configured to support a bearing of the second set of bearings and act as a suspension for the bearing. In some cases, the arm may bias the associated bearing toward the second guide rail. A bearing gasket 868 may also be provided to each wheel in the first set of bearings and the second set of bearings. The bearing gasket 868 is placed to block contaminants and otherwise seal areas of the moving element 804 where contaminants could collect.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A linear motor conveyor system comprising:
   a track comprising:
      a shaped guide rail;
      a second guide rail; and
   a plurality of moving elements, each of the plurality of moving elements comprising:
      a body;
      at least two shaped bearings supported by the body and configured to match with the shaped guide rail, wherein the shaped bearings are mounted to the moving element such that the moving elements overlap along the direction of the track providing a reduced tooling pitch between the moving elements;
      a second set of bearings supported by the body and configured to abut against the second guide rail; and
      a bearing suspension system configured to provide a suspension to the second set of bearings, wherein the bearing suspension system comprises a vertical rotary axis configured to allow the second set of bearings to pivot in relation to the second guide rail.

2. A linear motor conveyor system according to claim 1 wherein the shaped guide rail comprises a plurality of shaped guide rails and the at least two shaped bearings are configured such that some of the shaped bearings can run on corresponding ones of the shaped guide rails to allow the bearings and moving elements to overlap.

3. A linear motor conveyor system according to claim 1 wherein the bearing suspension system comprises a thinned body of the moving element configured to bias the second set of bearings towards the second guide rail.

4. A linear motor conveyor system according to claim 1 wherein the bearing suspension system comprises one or more of the bearings in the second set of bearings having a hollow area in the interior of the bearing.

5. A linear motor conveyor system according to claim 1 wherein each of the plurality of moving elements comprises:
   at least one magnet;
   a cover positioned over the at least one magnet;
   a body gasket positioned between the cover and the body of the moving element; and
   a plurality of bearing gaskets positioned between each of the at least two shaped bearings and the body of the moving element.

6. A linear motor conveyor system according to claim 1 wherein:
the second set of bearings is configured to be flat and the second guide rail is configured to be flat.

7. A linear motor conveyor system according to claim 1 wherein the bearing suspension system comprises a pair of arms, wherein each of the arms is configured to support a bearing of the second set of bearings and bias the bearing toward the second guide rail.

8. A moving element for moving on a track of a linear motor conveyor system, the moving element comprising:
at least one magnet for interacting with a linear motor of the track to move the moving element using electromagnetic forces;
a first set of bearings shaped to match with a first shaped guide rail of the track;
a second set of bearings configured to abut against a second guide rail of the track;
a bearing suspension system configured to provide a suspension to the second set of bearings, wherein the bearing suspension system comprises a vertical rotary axis configured to allow the second set of bearings to pivot in relation to the second guide rail; and
a body supporting the first bearing and the second bearing, wherein the body is shaped to allow the first bearing to at least partially overlap the body of an adjacent moving element.

9. A moving element according to claim 8 wherein the bearing suspension system comprises a thinned body of the moving element configured to bias the second set of bearings towards the second guide rail.

10. A moving element according to claim 8 wherein the bearing suspension system comprises one or more of the bearings in the second set of bearings having a hollow area in the interior of the bearing.

11. A moving element according to claim 8 further comprising:
a cover positioned over the at least one magnet;
a body gasket positioned between the cover and the body of the moving element; and
a plurality of bearing gaskets positioned between each bearing of the first and second set of bearings and the body of the moving element.

12. A moving element to claim 8 wherein the bearing suspension system comprises a pair of arms, wherein each of the arms is configured to support a bearing of the second set of bearings and bias the bearing toward the second guide rail.

13. A linear motor conveyor system comprising:
a track comprising:
a first guide rail having a shaped profile;
a second guide rail having a flat profile; and
a plurality of moving elements, each of the plurality of moving elements comprising:
a body;
a first set of bearings supported by the body and configured to match with the first guide rail, wherein the first set of bearings are mounted to the moving element such that the moving elements overlap along the direction of the track providing a reduced tooling pitch between the moving elements;
a second set of bearings configured to abut against the second guide rail of the track; and
a bearing suspension system configured to provide suspension to the second set of bearings wherein the bearing suspension system comprises a vertical rotary axis configured to allow the second set of bearings to pivot in relation to the second guide rail.

\* \* \* \* \*